Figure 1:
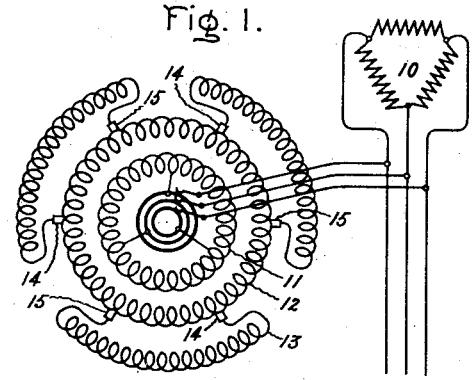

June 22, 1926.

J. I. HULL 1,590,030

BRUSH SHIFTING ALTERNATING CURRENT MOTOR

Filed Sept. 10, 1923   2 Sheets-Sheet 1

Inventor:
John I. Hull,
by Alexander F. Lunt
His Attorney.

June 22, 1926.

J. I. HULL 1,590,030

BRUSH SHIFTING ALTERNATING CURRENT MOTOR

Filed Sept. 10, 1923    2 Sheets-Sheet 2

Inventor:
John I. Hull,
by Alexander S. Lentz
His Attorney.

Patented June 22, 1926.

1,590,030

UNITED STATES PATENT OFFICE.

JOHN I. HULL, OF SCHENECTADY, NEW YORK, ASSIGNOR TO GENERAL ELECTRIC COMPANY, A CORPORATION OF NEW YORK.

BRUSH-SHIFTING ALTERNATING-CURRENT MOTOR.

Application filed September 10, 1923. Serial No. 661,769.

My invention relates to the brush shifting type alternating current motors such for example as that described in Schrage Reissue Patent No. 14,031, and has for its object an improved arrangement for shifting the brushes on such motors in such a manner that the power factor of the motor will be improved at all operating speeds.

In the type of motor described in the Schrage patent the speed is controlled by shifting two brush yokes in opposite directions. The machine, as is well known, may be considered to be an induction motor having the primary winding on the rotor and the secondary winding on the stator and preferably having an additional winding in the same slots as the primary winding, called a regulating winding, which regulating winding is similar to that of a direct current machine winding, and accordingly is connected to a commutator. Each phase of the secondary winding located on the stator is independent, one end being carried to a system of brushes on one of the brush yokes and the other end being carried to a system of brushes on the other brush yoke. If these two brush yokes are in such a position that the two opposite ends of each phase are in contact with the same commutator segments, the secondary winding is short circulated and the machine functions as an ordinary induction motor.

If the brush yokes are moved in opposite directions, thereby separating the brushes connected to the opposite ends of each phase, electromotive forces are injected into the secondary winding, and in accordance with the choice of the positions of the two brush yokes, either the speed or the power factor, or both, may be regulated. Thus to secure an adjustment of power factor which offers the most satisfactory compromise, it has been found desirable to have one brush yoke move slightly faster than the other yoke, as described for example in United States Patent No. 1,305,011, Ruedenberg, or No. 1,376,020, Korthals-Altes. By this simple means it is possible in practice to obtain full load power factors from 95 to 100 per cent. at the maximum speed, and from 65 to 75 per cent. at the minimum speed on machines which yield, when running at substantially synchronous speed as induction motors, power factors in the neighborhood of 80 or 82 per cent. Since with this simple means of shifting the brushes, the brushes must, at plain induction motor speed, lie on the same commutator segments, it is not possible to improve the power factor around synchronous speed over that inherent in the normal induction motor characteristics of the machine.

It is the object of my invention to provide a brush shifting arrangement for this type of motor by means of which the power factor at and near synchronism will be improved as well as at other speeds.

Figure 2:
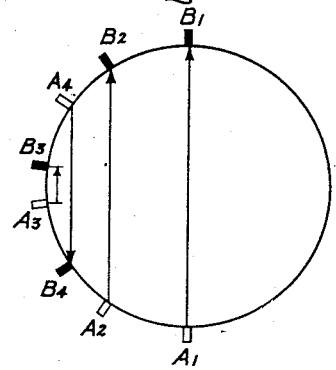
Figure 3:
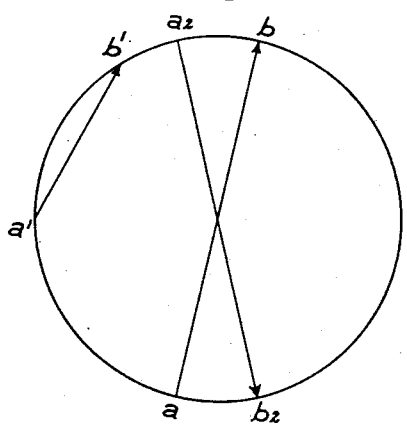
Figure 4:
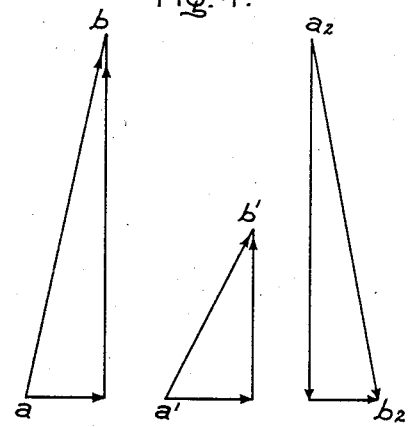
Figure 5:
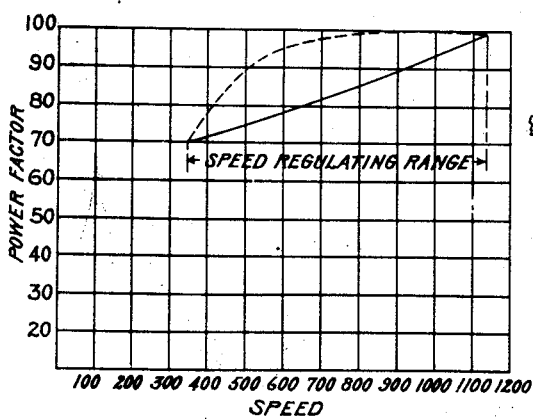
Figure 6:
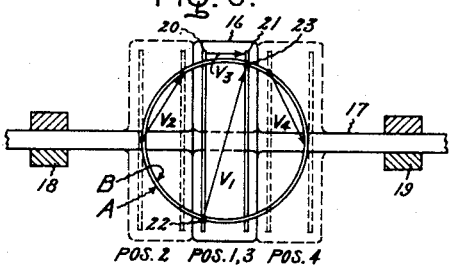
Figure 7:
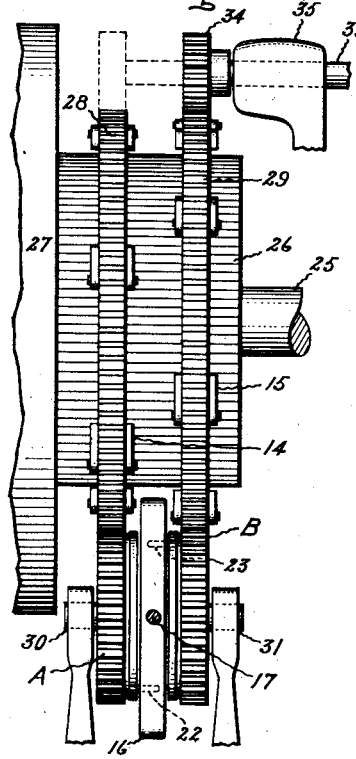
Figure 8:
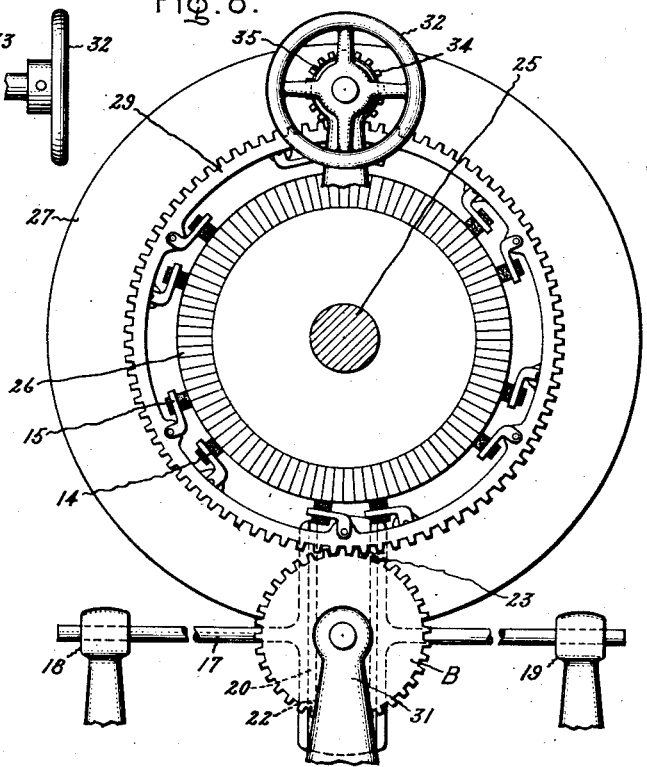

The features of my invention which I believe to be novel and patentable will be pointed out in the claims appended hereto. The theory of operation and the mechanism for carrying out my invention will now be described in connection with the accompanying drawings in which Fig. 1 represents the circuit connections and windings of a type of machine to which my invention is applicable; Fig. 2 represents the relation of the brushes on the commutator to the resulting voltage vectors injected into the secondary circuit by the commutator for different speeds where no attempt is made to improve the power factor; Fig. 3 represents vectorially one result obtained by my improved brush shifting arrangement in which there is at all speeds a voltage component in quadrature with the speed regulating component for improving the power factor. These components are separately illustrated in Fig. 4. Fig. 5 illustrates by means of curves the improvement in power factor which may be expected by means of my impoved mechanism; Fig. 6 shows a schematic diagram of a mechanism for obtaining potential differences corresponding to those represented in Figs. 4 and 5; and Figs. 7 and 8 show different views of the mechanism applied to the brush yokes of a machine to be regulated.

Referring to Fig. 1, 10 represents an alternating current source of supply, 11 indicates the primary rotor winding of the motor which is shown connected to the source of supply 10 by means of suitable brushes and slip rings, and 12 indicates the commutated regulating winding on the rotor which, according to Schrage, may be dispensed with in certain cases where it is desired to have the primary winding serve as the regulating winding in addition to its other function. The secondary stator winding represented at 13 has one end of each of its phases separately connected to brushes 14 which are carried on one of the brush yokes (see Figs. 7 and 8), and the other ends of each of its phases are separately connected to brushes 15 carried on the other brush yoke.

In Fig. 2 the relations of brushes on the commutator and ensuing vectors representing voltages injected into the secondary circuit by the commutator, are shown in which no attempt is made to adjust the power factor, but in which the primary object is the regulation of the speed. $A_1$ and $B_1$ may represent the positions of brushes on the two yokes for minimum speed, that is, the maximum regulation of the speed from synchonism down. Brush $A_1$ is connected to one end of one of the secondary phases and $B_1$ to the other end of the same phase. $A_2$ and $B_2$ represent the positions after the speed has been slightly increased and the speed regulation decreased. $A_3$ and $B_3$ represent the positions close to synchronism. $A_4$ and $B_4$ represent the positions after the motor has been regulated somewhat above synchronous speed. It will be at once apparent to one familiar with the differences of potential generated at various points around the circumference of a polyphase A. C. commutator that the vectors representing the differences of potential between the brushes for the various positions may be represented by the corresponding arrows as shown in Fig. 2.

In Fig. 3 I have indicated how the relations of Fig. 2 may be advantageously changed for the maximum and minimum speed in order to obtain better power factor. In Fig. 4 these vectors are separately illustrated where it will be seen that in each of the vectors there is retained not only a vertical component to regulate the speed, but a component in quadrature thereto to adjust the power factor. For the sake of simplicity I have shown the power factor adjustment as constant. Even more desirable results will be obtained with a certain variation in this component. It will be apparent that if the power factor adjusting component is retained when the speed adjustment is near synchronism, power factor improvement will be obtained not only at considerable ranges of speed away from synchronism but also at synchronous speed and at ranges of speed near synchronism.

In Fig. 6 I have shown schematically a mechanism for obtaining differences of potential between the two brushes comparable to those represented by the vectors of Fig. 3 for all speeds. In Fig. 6 the circles A and B denote wheels which are to be so geared to the two brush yokes that for each mechanical degree that wheel A moves, its corresponding yoke moves one electrical degree and for each mechanical degree that wheel B moves, the brush yoke to which it is connected moves one electrical degree. The member 16 is a solid inflexible member fixed on a rod 17 which can slide back and forth in fixed guides 18 and 19. Member 16 is provided with two slots 20 and 21 respectively engaging with pegs 22 and 23 on wheels A and B.

Consider the first or solid line position 1 of member 16. The vector representing the differences of potential between the two brushes connected to the opposite ends of a phase of the secondary winding may be represented by $V_1$. If we turn wheel A in a clockwise direction, it is apparent that we can proceed to the dotted line position 2 of member 16 and that wheel B will be moved by the motion of the member 16 to the position indicated. Pegs 22 and 23 will slide in their respective slots so that the vector representing the differences of potential between the two brushes will now be $V_2$. If we continue to move wheel A in a clockwise direction, the motion of wheel B will be reversed and we can proceed continuously to position 3 which coincides in the diagram with position 1 as far as member 16 is concerned. However, it will be observed that peg 22 on wheel A has moved nearly 180 degrees from its position 1 location while peg 23 on wheel B has been brought back to its original position and the vector representing the differences of potential between the two brushes of the considered phase of the secondary winding is now shown as $V_3$ which has no speed regulating component but does have the required power factor correcting component.

It is apparent in position 2 that it is only possible to drive the mechanism through wheel A and that the mechanism could not be driven by moving wheel B. If we go to position 4, it is obvious that this relation is reversed and it is only possible to drive the mechanism by moving wheel B. Therefore it will be desirable at approximately position 3 to change the driving member of the mechanism from wheel A to wheel B, which may readily be accomplished in practice by disengaging a clutch driving a pinion engaged with wheel A and engaging a clutch with a pinion driving wheel B. In position 4 the vector representing the differences of potential between the two considered brushes is shown as $V_4$ and corresponds to a speed regulating position on the opposite side of synchronism from position 1.

Referring to Figs. 7 and 8, where I have illustrated the mechanism of the brush shifting mechanism just described as applied to a 6-pole motor, the shaft of the motor is represented at 25, the commutator at 26, the rotatable armature at 27, the brush yokes at 28 and 29, and the corresponding brushes at 14 and 15. Since this motor is taken as a 6-pole motor, 360 electrical degrees corresponds to 120 mechanical degrees on its commutator and consequently the wheels A and B of the brush shifting mechanism should be geared to the brush yokes 28 and 29 in a ratio of 3 to 1. The two brush yokes will be suitably supported in guides not shown and mechanically connected to the brush shift controlling mechanism by means of appropriate gearing represented on the periphery of the brush yokes and on the peripheries of wheels A and B. Thus, wheel A, which carries peg 22, is geared to brush yoke 28 and wheel B, which carries peg 23, is geared to yoke 29 and the pegs slide in slots 20 and 21 in the common member 16 mounted between wheels A and B beneath the commutator. Wheels A and B are rotatively mounted in suitable bearings indicated at 30 and 31 and member 16 is mounted for horizontal movement between the wheels A and B by means of rod 17 and guides 18 and 19.

The means for driving the brush shifting mechanism is represented as a hand wheel 32 secured through shaft 33 to a gear 34. The shaft 33 is rotatably mounted in a suitable guide bearing 35 and is arranged to be slid through its bearing in a horizontal direction so that gear 34 may engage with the gear teeth on either brush yoke, as indicated by dotted lines, thus complying with the requirement that the drive for the brush shifting mechanism be shifted from wheel A to wheel B, and vice versa, in certain positions of the mechanism. If a remote control motor is used for shifting the brushes, it will preferably be provided with automatic means dependent upon the position of the mechanism for shifting the drive from one wheel to the other and vice versa, as conditions require.

Obviously, differences of potential varying in a manner similar to that denoted in Fig. 3 can be obtained by the use of this mechanism. It is also obvious that various alterations of the mechanism may prove to be desirable such that the quadrature component may be made variable with the brush position instead of constant, as illustrated for simplicity. Thus, the slots in the member 16 need not necessarily both be straight, but one or both may be curved so as to approximately vary the quadrature component or, if desirable, the slots may be straight, but not parallel.

In many applications of this type of motor it will be preferable to retain the more simple brush shifting mechanism described by Ruedenberg or Korthals-Altes. In some cases, however, it may be very desirable because of power factor penalties or other reasons to use an arrangement like that described above so that the power factors may be maintained at a higher value over that portion of the speed range not subject to correction in the more simple arrangement. A comparison of typical results with the simple arrangement and with the brush shifting arangement of my invention is illustrated in the curves of Fig. 5, where the full line curve represents the power factors over the speed regulating range at full load with the simple brush shifting arrangement and the dotted line curve represents the power factor obtainable by the use of my invention under similar conditions.

In accordance with the provisions of the patent statutes I have described the principle of operation of my invention, together with the apparatus which I now consider to represent the best embodiment thereof; but I desire to have it understood that the apparatus shown is only illustrative and that the invention can be carried out by other means.

What I claim as new and desire to secure by Letters Patent of the United States, is:—

1. In an alternating current motor of the type provided with a regulating commutated winding on the primary connected to a phase wound winding on the secondary through two sets of adjustable brushes, a brush shifting mechanism therefor for adjusting said brushes so as to regulate the speed of said motor through synchronism, said mechanism being provided with means for continuously maintaining said brushes in a power factor correcting relation.

2. An alternating current motor comprising a primary member having a rotor winding provided with a commutator, slip rings for supplying said rotor from an alternating current source, two sets of brushes bearing on said commutator, a secondary member provided with a winding supplied from both of said sets of brushes and a brush shifting mechanism interlocking said sets of brushes for adjusting the speed of said motor from below to above synchronism and vice versa, said mechanism being provided with means for maintaining said brushes in a power factor correcting relation in all positions of adjustment.

3. The method of controlling the speed and power factor of an alternating current motor wherein a regulating commutated winding is connected to a relatively movable secondary winding through sets of brushes associated with the opposite ends of the different phases of said secondary winding which comprises successively moving the brushes connected to opposite ends of said secondary phase windings in opposite directions at different rates of speed, moving said brushes in the same direction at different rates of speed, and moving said brushes in the opposite direction at different rates of speed.

4. In an alternating current commutator motor, a brush shifting device for regulating said motor comprising cooperating sets of brushes, a pair of yokes for movably supporting said sets of brushes, a motion transmitting mechanism between said yokes which, when moved through the operating range, causes said brush yokes to move in a continually varying speed ratio with respect to each other and through a range where the relative direction of movement between the brush yokes is changed, and means for rotating either of said brush yokes.

5. The method of controlling the speed and power factor of an alternating current motor wherein a regulating commutated winding is connected to a relatively movable secondary winding through sets of brushes associated with the opposite ends of the different phases of said secondary winding which comprises successively moving the brushes connected to opposite ends of said secondary phase windings in opposite directions, reversing direction of movement of one of said brushes before said brushes meet, moving said brushes in the same direction, and moving said brushes in opposite directions.

6. In an alternating current commutator motor, a brush shifting device comprising cooperating sets of brushes, a pair of rotatably mounted yokes for movably supporting said sets of brushes, a motion transmitting mechanism between said brush yokes for causing said yokes to move in a predetermined relation with respect to each other and providing a driving connection between the brush yokes which is ineffective for one direction of drive in one position of the brushes and is ineffective for the opposite direction of drive in a different position of the brushes, and driving means for said brush yokes arranged to be shifted from one brush yoke to the other.

7. In an alternating current commutator motor, a brush shifting device comprising cooperating sets of brushes, a pair of rotatably mounted yokes for movably supporting said sets of brushes, said yokes being mechanically connected together through a motion transmitting mechanism comprising a pair of wheels respectively connected to said brush yokes so as to be rotated one mechanical degree for each electrical degree of rotation of its corresponding yoke, said wheels being rotatably mounted side by side on the same axis of rotation, a member mounted between said wheels so as to permit of a reciprocating motion at right angles to the axis of rotation of said wheels, a pair of slots spaced apart in said member arranged at substantially right angles to the direction of its reciprocating motion, a pin in each wheel engaging with one of said slots and means for rotating either of said wheels.

8. An alternating current motor of the type provided with a regulating commutated winding on the primary connected to a phase wound winding on the secondary through two sets of adjustable brushes, a brush shifting mechanism therefor comprising a pair of brush yokes and cam members interlocked between said yokes for adjusting said brushes so as to regulate the speed of said motor through synchronism, said cam members having relative movements such as to maintain a desirable spacing between the brushes for the purpose of power factor correction while shifting said brushes to control the speed of said motor through synchronism.

9. In an alternating current commutator motor of the type wherein the speed and the power factor are controlled by adjusting the relative positions of two sets of brushes with respect to the commutator and to each other, the method of securing a reversed phase relation between corresponding sets of brushes such as will control the speed of said motor through synchronism, while maintaining the voltage between said brushes above a zero value which consists in moving said brushes, while spaced apart, in the same direction about the commutator through such phase reversing region.

10. In an alternating current motor of the type provided with a regulating commutated winding on the primary connected to a phase wound winding on the secondary through two sets of adjustable brushes, the method of regulating the speed of said motor from above to below synchronism, or vice versa, while maintaining the brushes in a power factor correcting relation which consists in shifting corresponding brushes of each set in opposite directions at different rates of speed, reversing the direction of movement of one set of brushes and then moving said sets of brushes in the same direction at different rates of speed.

In witness whereof, I have hereunto set my hand this 8th day of September, 1923.

JOHN I. HULL.